(12) United States Patent
Biswas et al.

(10) Patent No.: US 7,540,020 B1
(45) Date of Patent: May 26, 2009

(54) METHOD AND APPARATUS FOR FACILITATING SINGLE SIGN-ON TO APPLICATIONS

(75) Inventors: Kamalendu Biswas, Foster City, CA (US); Arun Swaminathan, San Carlos, CA (US); Gaurav Bhatia, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 889 days.

(21) Appl. No.: 10/370,970

(22) Filed: Feb. 19, 2003

(51) Int. Cl.
 *H04L 21/00* (2006.01)
(52) U.S. Cl. ......................................................... 726/6
(58) Field of Classification Search ................... 726/29, 726/6
 See application file for complete search history.

(56) References Cited

U.S. PATENT DOCUMENTS

| | | | |
|---|---|---|---|
| 6,327,658 B1 * | 12/2001 | Susaki et al. ................ | 713/176 |
| 6,763,468 B2 * | 7/2004 | Gupta et al. .................... | 726/2 |
| 6,892,307 B1 * | 5/2005 | Wood et al. ..................... | 726/8 |
| 7,171,473 B1 * | 1/2007 | Eftis et al. ................... | 709/227 |
| 7,219,154 B2 * | 5/2007 | Blakley et al. ............... | 709/229 |
| 2004/0128393 A1 * | 7/2004 | Blakley et al. ............... | 709/229 |

OTHER PUBLICATIONS

Orchard et al, Oasis Security Services Dynamic Session Specification, May 3, 2001.*

* cited by examiner

*Primary Examiner*—Andrew L Nalven
(74) *Attorney, Agent, or Firm*—Park, Vaughan & Fleming LLP; Edward J. Grundler

(57) ABSTRACT

One embodiment of the present invention provides a system that performs single sign-on to web applications using dynamic directives. The system operates by first receiving a request at an application to provide content to a user. In response to the request, the application provides public content to the user. Upon receiving a request from the user to access private content, the application sends a dynamic directive to a web module that can access a single sign-on server on behalf of the application, wherein the dynamic directive specifies that an authentication credential is required from the user. Next, the application allows the web module to request the authentication credential from the single sign-on server on behalf of the application. When the authentication credential is received from the single sign-on server, the application provides the private content to the user.

18 Claims, 4 Drawing Sheets

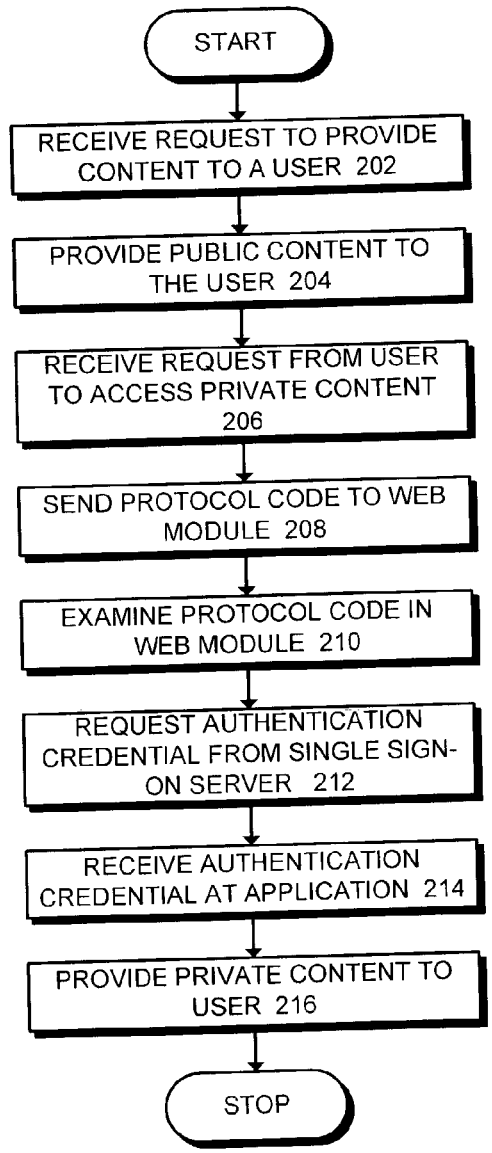
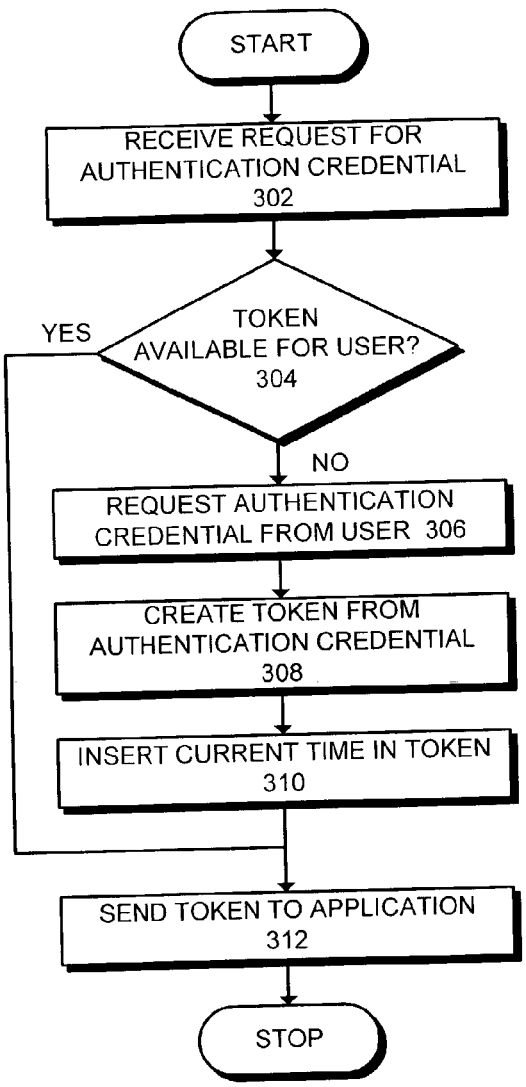
FIG. 2
FIG. 3

METHOD AND APPARATUS FOR FACILITATING SINGLE SIGN-ON TO APPLICATIONS

BACKGROUND

1. Field of the Invention

The present invention relates to the process of signing on to applications. More specifically, the present invention relates to a method and an apparatus that facilitates single sign-on to web applications using dynamic directives.

2. Related Art

Modern web applications provide users with unprecedented access to data, much of which is private and intended to be accessed only by a single user. Web applications that allow a user to access private information typically require the user to be authenticated prior to accessing the private information. This authentication process typically requires to user to provide a user name and password, a digital certificate, or other type of authentication credential.

Users typically access many related web applications, which provide access to private data. In an effort to reduce the number of times that a user has to enter authentication credentials, some related web applications, (also called "partner applications,") make use of a single sign-on server. By using a single sign-on server, a user has to enter authentication credentials only once to gain access to multiple partner applications and external applications.

A number of techniques can be used to enable an application to make use of a single sign on server. One technique involves integrating functions from a software development kit (SDK) into the application to enable the application to access the single sign-on server. This technique allows the application to control when and how the single sign-on server is accessed. However, it requires a considerable amount of programming effort to integrate the functions provided by the SDK into the application. Additionally, the technique must be separately applied to each of the partner applications.

Another technique is to provide a module on the web server that can access the single sign-on server on behalf of an application. Unfortunately, this technique does not allow the application to control how and when the single sign-on server is accessed. The application is therefore not able to provide either public data only, or both public and private data, depending on whether the user has been authenticated. Moreover, the module accesses the single sign-on server to authenticate the user, even if the user only wants to access public data from the application.

Hence, what is needed is a method and an apparatus that facilitates a single sign-on to a group of partner applications without the problems described above.

SUMMARY

One embodiment of the present invention provides a system that performs single sign-on to web applications using dynamic directives. The system operates by first receiving a request at an application to provide content to a user. In response to the request, the application provides public content to the user. Upon receiving a request from the user to access private content, the application sends a dynamic directive to a web module that can access a single sign-on server on behalf of the application, wherein the dynamic directive specifies that an authentication credential is required from the user. Next, the application allows the web module to request the authentication credential from the single sign-on server on behalf of the application. When the authentication credential is subsequently received from the single sign-on server, the application provides the private content to the user.

In a variation of this embodiment, if the single sign-on server currently has a token including the authentication credential for the user, the system updates an access time within the token and supplies the token to the web module.

In a further variation, if the single sign-on server does not currently have the token for the user, the system requests the authentication credential from the user. The system then creates the token, which includes the authentication credential and the access time, and then supplies the token to the web module.

In a further variation, if the access time within the token indicates that a specified timeout period has elapsed, the system sends a second dynamic directive to the web module from the application, wherein the second dynamic directive requests a logout. Upon examining the second dynamic directive and discovering the logout is requested, the web module requests that the single sign-on server log out the user. The single sign-on server subsequently informs current applications that the user has logged out.

In a further variation, the system intercepts hypertext transfer protocol (HTTP) requests to and responses from the application.

In a further variation, the authentication credential includes a user name and a password.

In a further variation, a protocol code within the first dynamic directive includes a hypertext transfer protocol (HTTP) transaction code.

In a further variation, the system receives a logout request from the user at the application. In response to the logout request, the system sends a second dynamic directive requesting the logout to the web module from the application. Upon examining the second dynamic directive and discovering that the logout is requested, the web module requests that the single sign-on server log out the user. The single sign-on server subsequently informs current applications that the user has logged out.

BRIEF DESCRIPTION OF THE FIGURES

FIG. 2 is a flowchart illustrating the process of providing both public and private content to a user in accordance with an embodiment of the present invention.

FIG. 3 is a flowchart illustrating the process of creating a single sign-on server token in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Website Host Computer

Figure 1:
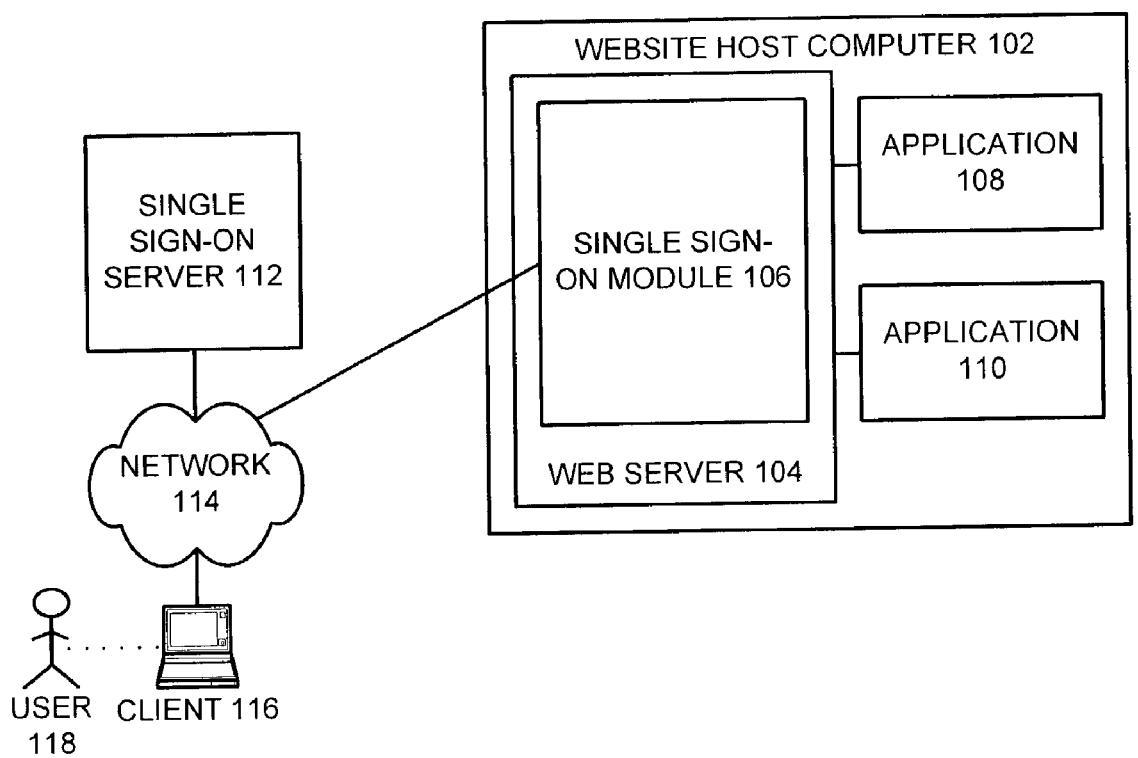
FIG. 1 illustrates a host computer for a web site in accordance with an embodiment of the present invention.

FIG. 1 illustrates a website host computer 102 in accordance with an embodiment of the present invention. Website host computer 102 includes web server 104 and applications 108 and 110. Note that website host computer 102 can include more applications than are shown in FIG. 1. Note that web server 104 contains a single sign-on module 106. Website host computer 102 can generally include any computational node including a mechanism for servicing requests from a client for computational and/or data storage resources.

User 118 accesses applications 108 and 110 across network 114 through client 116. Single sign-on server 112 is coupled to network 114 and communicates with client 116 and single sign-on module 106. Network 114 can generally include any type of wire or wireless communication channel capable of coupling together computing nodes. This includes, but is not limited to, a local area network, a wide area network, or a combination of networks. In one embodiment of the present invention, network 114 includes the Internet.

During operation, user 118 uses client 116 to send a request across network 114 to an application, say application 108, to receive content from application 108. Single sign-on module 106, within web server 104 receives the request and forwards the request to application 108. Application 108 responds with public content, which is sent to client 116 across network 114 by single sign-on module 106.

If user 118 wishes to receive private content from application 108, user 118 requests the private content, possibly by clicking on a login icon on client 116. This request is sent from client 116 across network 114 to single sign-on module 106. Single sign-on module 106 forwards this request to application 108. Application 108 responds with a protocol code indicating that authentication is required. This protocol code can be the hypertext transfer protocol (HTTP) transaction code 401-"authentication required."

Single sign-on module 106 intercepts the HTTP response and inspects the protocol code. When single sign-on module 106 ascertains that the protocol code indicates authentication required, single sign-on module 106 requests single sign-on server 112 to supply an authorization token. This token includes user authentication credentials and a "last accessed" time stamp. If single sign-on server 112 does not have a current token for the user, single sign-on server 112 requests authentication credentials from user 118. After receiving the authentication credentials, single sign-on server 112 creates the token using these authentication credentials and the current time. The token is then passed to application 108 via single sign-on module 106. Note that the token is typically encrypted using an encryption method and key known to both single sign-on server 112 and application 108.

After receiving the token from single sign-on server 112, application 108 ensures that a timeout period has not expired by comparing the current time with the time in the token. If the timeout period has not elapsed, application 108 updates the time within the token to the current time and returns the token to single sign-on server 112 and provides the requested content to user 118. If the timeout period has elapsed, application 108 sends an HTTP response including a protocol code, which indicates that a timeout has occurred. Single sign-on module 106 forwards the protocol code to single sign-on server 112 where single sign-on server 112 logs out user 118 and informs all logged in applications that user 118 has logged out.

While user 118 is logged on to application 108 and a current token is available on single sign-on server 112, if user 118 accesses another partner application, such as application 110, and requests private content, application 110 responds in the same manner as application 108 described above. In this instance, however, a current token is available at single sign-on server 112, and this token is forwarded to application 110 without intervention by user 118.

When user 118 requests a logout, possibly by clicking on a logout icon on client 116, the request is sent to the application, say application 108. In response, application 108 sends an HTTP protocol code to single sign-on module 106 indicating that logout is required. Single sign-on module 106 forwards this protocol code to single sign-on server 112. Single sign-on server 112 logs out user 118 and informs all logged in applications that user 118 has logged out. Note that since the applications communicate with single sign-on module 106 using HTTP protocol codes, the applications do not need to be modified to take advantage of single sign-on server 112. However, the applications remains in control of the process and can supply both public and private content to user 118 as required.

Providing Content

FIG. 2 is a flowchart illustrating the process of providing public and private content to a user in accordance with an embodiment of the present invention. The system starts when an application, say application 108, receives a request from user 118 to provide content (step 202). In response, application 108 provides public content to user 118 (step 204).

Next, user 118 requests access to private content (step 206). In response, application 108 sends a protocol code to single sign-on web module 106 (step 208). Note that this protocol code is an HTTP transaction code, which indicates that authentication is required. Single sign-on web module 106 then examines the protocol code (step 210).

When single sign-on web module 106 determines that the protocol code is the authentication needed transaction code, single sign-on web module 106 requests an authentication credential from single sign-on server 112 (step 212). If single sign-on server 112 has a current token for user 118, the token is forwarded to application 108. Otherwise, single sign-on server 112 gets the authentication credential from user 118. This process is described in more detail in conjunction with FIG. 3 below. Next, application 108 receives the authentication credential and a time stamp in the token (step 214). In response, application 108 provides private content to user 118 (step 216).

Creating a Token

FIG. 3 is a flowchart illustrating the process of creating a single sign-on server token in accordance with an embodiment of the present invention. The system starts when single sign-on server 112 receives a request for an authentication credential for user 118 (step 302). Next, single sign-on server 112 determines if there is a token available for user 118 (step 304).

If there is no token available for user 118, single sign-on server 112 requests an authentication credential from user 118 (step 306). Note that this authentication credential can include a user name and password, a digital certificate, or other data used for authentication. Upon receiving the authentication credential from user 118, single sign-on server 112 creates a token using the authentication credential (step 308). Next, single sign-on server 112 initializes an "access time" field within the token to the current time (step 310).

If the token is available at step 304 or after creating the token at steps 306-310, single sign-on server 112 supplies the token to application 108 (step 312).

User Logout

Figure 4:
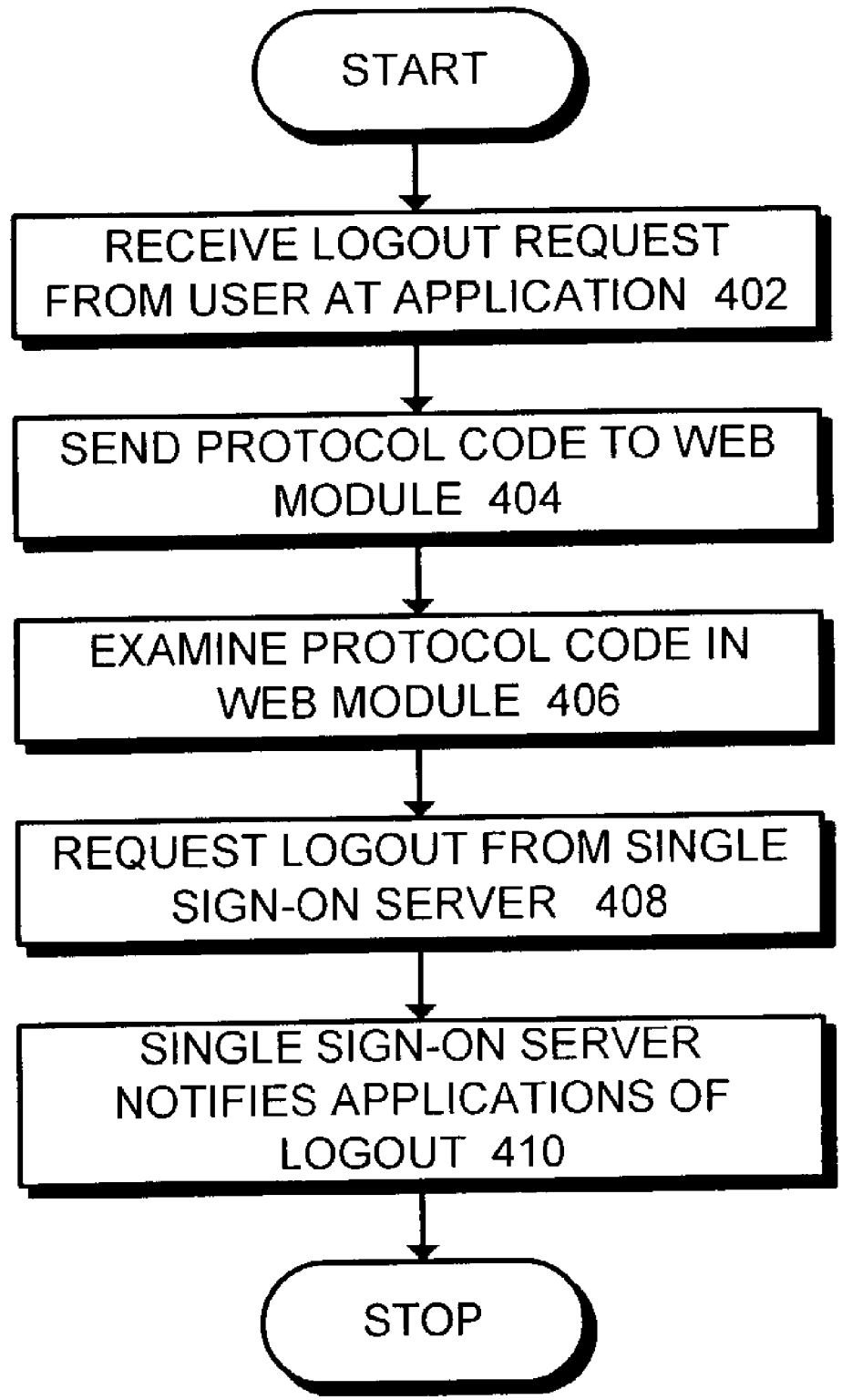
FIG. 4 is a flowchart illustrating the process of responding to a logout request in accordance with an embodiment of the present invention.

FIG. 4 is a flowchart illustrating the process of responding to a logout request in accordance with an embodiment of the present invention. The system starts when a partner application, say application 108, receives a logout request from user 118 (step 402). Next, application 108 sends an HTTP protocol code indicating logout to single sign-on web module 106 (step 404). Single sign-on web module 106 then examines the protocol code (step 406). In response to this protocol code, single sign-on module 106 requests a logout from single sign-on server 112 (step 408). In response to this request, single sign-on server 112 deletes the token for user 118 and informs the partner applications that user 118 has logged out (step 410).

Timeout

Figure 5:
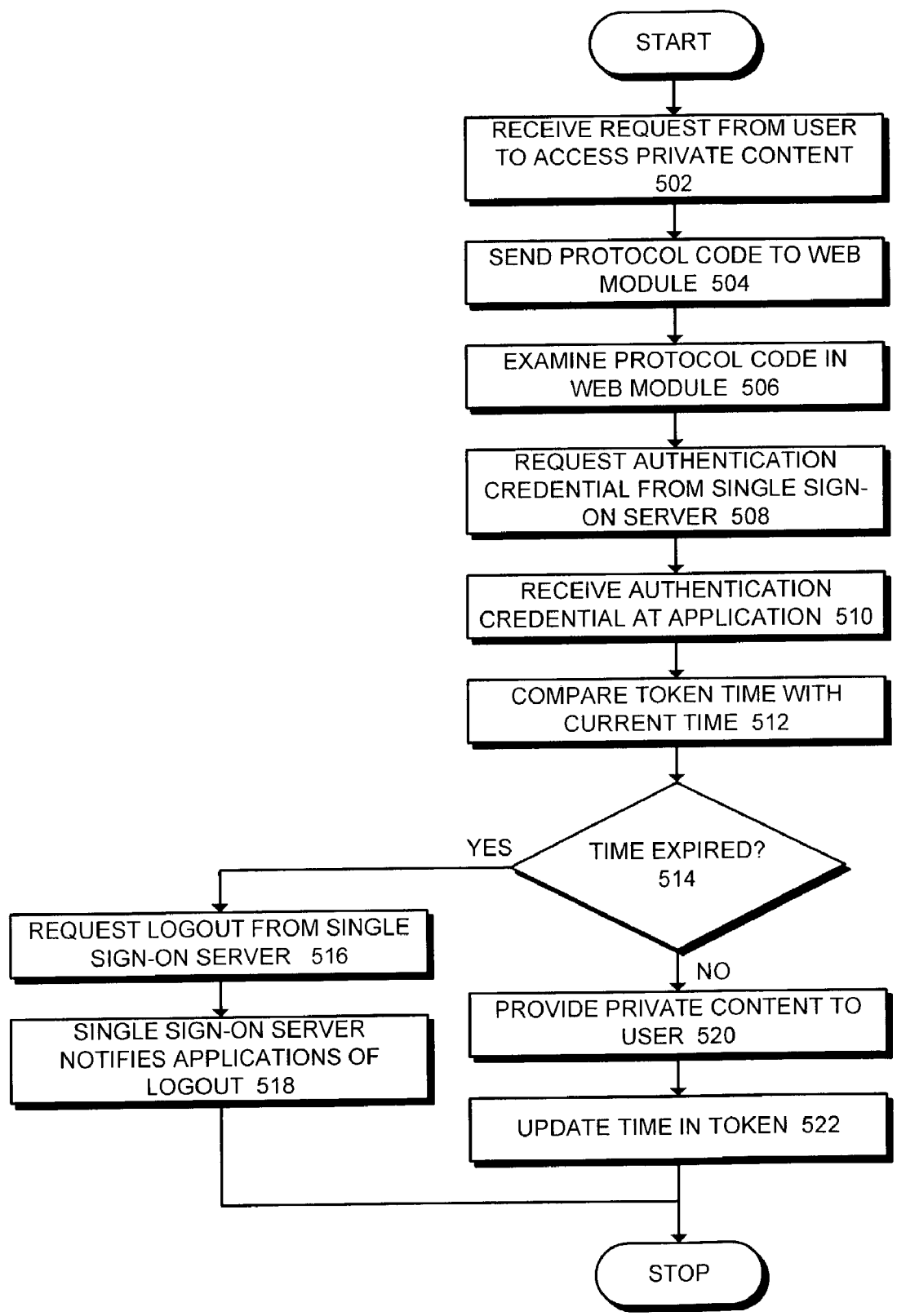
FIG. 5 is a flowchart illustrating the process of responding to a timeout in accordance with an embodiment of the present invention.

FIG. 5 is a flowchart illustrating the process of responding to a timeout in accordance with an embodiment of the present invention. The system starts when an application, say application 108, receives a request from a user, say user 118, to access private content (step 502). In response, application 108 sends a protocol code to single sign-on web module 106 (step 504). Note that this protocol code is an HTTP transaction code, which indicates that authentication is required. Single sign-on web module 106 then examines the protocol code (step 506).

When single sign-on web module 106 determines that the protocol code is the authentication needed transaction code, single sign-on web module 106 requests an authentication credential from single sign-on server 112 (step 508). Next, application 108 receives the authentication credential and a time stamp in the token (step 510).

After receiving the token, application 108 compares the "access time" in the token with the current time (step 512). Application 108 then determines if a stated timeout period has expired (step 514). If so, application 108 sends an HTTP transaction code indicating a timeout, to single sign-on module 106 (step 518). In response, single sign-on module 106 requests single sign-on server 112 to log out user 118 (step 518). Single sign-on server 112 cancels the token and notifies the partner applications that user 118 has been logged out (step 518).

If the time has not expired at step 514, application 108 provides the private content to user 118 (step 520). Finally, application 108 updates the "access time" in the token and returns the token (step 522).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing single sign-on to web applications on a website host computer using dynamic directives, comprising:

receiving a first request at a web application from a user to access public content;

providing the public content to the user;

receiving a second request from the user to access private content;

sending a first dynamic directive to a web module, wherein the first dynamic directive specifies that an authentication credential is required from the user, and wherein the web module can access a single sign-on server on behalf of the application;

allowing the web module to request the authentication credential from the single sign-on server on behalf of the application;

when a token is received from the single sign-on server at the application, wherein the token includes the authentication credential and an access time, providing private content to the user;

when a logout request is sent by the user to the application and the logout request is received from the user at the application, sending a second dynamic directive to the web module from the application, wherein the second dynamic directive requests a logout;

upon examining the second dynamic directive in the web module and discovering that the logout is requested, requesting that the single sign-on server log out the user, and informing partner applications that the user has logged out, wherein the user is logged out only with respect to receiving private content from the partner applications, wherein the partner applications are related applications that also make use of the single sign on server; and wherein if the access time within the token indicates that a specified timeout period has elapsed:

sending a third dynamic directive to the web module from the application, wherein the third dynamic directive requests a logout; and allowing the web module to, discover that the logout is requested, request that the single sign-on server log out the user, and inform all partner applications that the user has logged out, wherein the user is logged out only with respect to receiving private content from the partner applications.

2. The method of claim 1, wherein if the single sign-on server currently has the token for the user, the method further comprises:

updating the access time within the token; and supplying the token to the web module, wherein the token includes the authentication credential.

3. The method of claim 2, wherein if the single sign-on server does not currently have the token for the user, the method further comprises:

requesting the authentication credential from the user;

receiving the authentication credential from the user;

creating the token, wherein the token includes the authentication credential and the access time; and supplying the token to the web module.

4. The method of claim 1, wherein the web module intercepts requests sent to and responses received from the application.

5. The method of claim 1, wherein the authentication credential includes a user name and a password.

6. The method of claim 1, wherein a protocol code in the first dynamic directive includes a hypertext transfer protocol (HTTP) transaction code.

7. A computer-readable storage medium storing instructions that when executed by a computer cause the computer to perform a method for performing single sign-on to web applications on a website host computer using dynamic directives, the method comprising:
    receiving a first request at a web application from a user to access public content;
    providing the public content to the user;
    receiving a second request from the user to access private content;
    sending a first dynamic directive to a web module, wherein the first dynamic directive specifies that an authentication credential is required from the user, and wherein the web module can access a single sign-on server on behalf of the application;
allowing the web module to request the authentication credential from the single sign-on server on behalf of the application;
    when a token is received from the single sign-on server at the application wherein the token includes the authentication credential and an access time,
    providing private content to the user;
    when a logout request is sent by the user to the application and the logout request is received from the user at the application,
        sending a second dynamic directive to the web module from the application, wherein the second dynamic directive requests a logout;
        upon examining the second dynamic directive in the web module and discovering that the logout is requested,
            requesting that the single sign-on server log out the user, and informing partner applications that the user has logged out,
    wherein the user is logged out only with respect to receiving private content from the partner applications, wherein the partner applications are related applications that also make use of the single sign on server; and
    wherein if the access time within the token indicates that a specified timeout period has elapsed:
        sending a third dynamic directive to the web module from the application, wherein the third dynamic directive requests a logout; and
        allowing the web module to,
            discover that the logout is requested,
            request that the single sign-on server log out the user, and
            inform all partner applications that the user has logged out, wherein the user is logged out only with respect to receiving private content from the partner applications, wherein the partner applications are related applications that also make use of the single sign on server.

8. The computer-readable storage medium of claim 7, wherein if the single sign-on server currently has the token for the user, the method further comprises:
    updating the access time within the token; and
    supplying the token to the web module, wherein the token includes the authentication credential.

9. The computer-readable storage medium of claim 8, wherein if the single sign-on server does not currently have the token for the user, the method further comprises:
    requesting the authentication credential from the user;
    receiving the authentication credential from the user;
    creating the token, wherein the token includes the authentication credential and the access time; and
    supplying the token to the web module.

10. The computer-readable storage medium of claim 7, wherein the web module intercepts requests sent to and responses received from the application.

11. The computer-readable storage medium of claim 7, wherein the authentication credential includes a user name and a password.

12. The computer-readable storage medium of claim 7, wherein a protocol code in the first dynamic directive includes a hypertext transfer protocol (HTTP) transaction code.

13. An apparatus for performing single sign-on to web applications on a website host computer using dynamic directives, comprising:
    a receiving mechanism configured to receive a first request at a web application from a user to access public content;
    a providing mechanism configured to provide the public content to the user;
    wherein the receiving mechanism is further configured to receive a second request from the user to access private content;
    a sending mechanism configured to send a first dynamic directive to a web module, wherein the first dynamic directive specifies that an authentication credential is required from the user, and wherein the web module can access a single sign-on server on behalf of the application;
    a requesting mechanism configured to request the authentication credential from the single sign-on server;
    wherein the providing mechanism is further configured to provide private content to the user when a token is received from the single sign-on server at the application, wherein the token includes the authentication credential and an access time:
    wherein the receiving mechanism is further configured to receive a logout request from the user at the application, wherein the logout request is sent by the user to the application;
    wherein the sending mechanism is further configured to send a second dynamic directive to the web module from the application, wherein the protocol code in the second dynamic directive requests a logout;
    an examining mechanism configured to examine the protocol code in the web module to discover that the logout is requested;
    wherein the requesting mechanism is further configured to request the single sign-on server to log out the user;
    wherein if the access time within the token indicates that a specified timeout period has elapsed:
        the sending mechanism is further configured to send a third dynamic directive to the web module from the application, wherein the third dynamic directive requests a logout;
        a discovering mechanism configured to discover that the logout is requested;
        wherein the requesting mechanism is further configured to request the single sign-on server to log out the user; and
        a logout mechanism configured to inform all partner applications that the user has logged out, wherein the user is logged out only with respect to receiving private content from the partner applications, wherein the partner applications are related applications that also make use of the single sign on server.

14. The apparatus of claim 13, further comprising:
    an updating mechanism configured to update the access time within the token; and
    a token supplying mechanism configured to supply the token to the web module, wherein the token includes the authentication credential.

15. The apparatus of claim 14,
    wherein the requesting mechanism is further configured to request the authentication credential from the user if the single sign-on server does not currently have the token for the user; and wherein the apparatus further comprises:

a credential receiving mechanism configured to receive the authentication credential from the user a creating mechanism configured to create the token, wherein the token includes the authentication credential and the access time; and a token supplying mechanism configured to supply the token to the web module.

16. The apparatus of claim 13, further comprising an intercept mechanism within the web module that is configured to intercept requests sent to and responses received from the application.

17. The apparatus of claim 13, wherein the authentication credential includes a user name and a password.

18. The apparatus of claim 13, wherein a protocol code in the first dynamic directive includes a hypertext transfer protocol (HTTP) transaction code.

* * * * *

UNITED STATES PATENT AND TRADEMARK OFFICE
CERTIFICATE OF CORRECTION

PATENT NO. : 7,540,020 B1
APPLICATION NO. : 10/370970
DATED : May 26, 2009
INVENTOR(S) : Biswas et al.

It is certified that error appears in the above-identified patent and that said Letters Patent is hereby corrected as shown below:

In column 8, line 30, in claim 13, delete "time:" and insert -- time; --, therefor.

Signed and Sealed this

Twenty-fifth Day of May, 2010

David J. Kappos
*Director of the United States Patent and Trademark Office*